(12) United States Patent
Senoo

(10) Patent No.: US 9,998,037 B2
(45) Date of Patent: Jun. 12, 2018

(54) CONTROL APPARATUS OF SYNCHRONOUS MOTOR

(71) Applicant: FANUC CORPORATION, Yamanashi (JP)

(72) Inventor: Tatsuya Senoo, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days. days.

(21) Appl. No.: 15/165,599

(22) Filed: May 26, 2016

(65) Prior Publication Data

US 2016/0365811 A1  Dec. 15, 2016

(30) Foreign Application Priority Data

Jun. 11, 2015  (JP) ................................. 2015-118620

(51) Int. Cl.
*H02P 27/00* (2006.01)
*H02P 3/22* (2006.01)
(Continued)

(52) U.S. Cl.
CPC ................ *H02P 3/22* (2013.01); *H02P 21/22* (2016.02); *H02P 21/36* (2016.02); *H02P 27/08* (2013.01)

(58) Field of Classification Search
CPC .......... H02P 6/18; H02P 21/06; H02P 21/146; H02P 21/0035; H02P 2207/05; Y02T 10/643
(Continued)

(56) References Cited

U.S. PATENT DOCUMENTS 7,498,761 B2 * 3/2009 Iwashita ............... H02P 29/032
318/609
8,188,695 B2 * 5/2012 Chen ..................... B60K 6/365
318/400.33
(Continued)

FOREIGN PATENT DOCUMENTS

DE         19944244 A1   3/2000
DE    102011001278 A1   3/2014
(Continued)

OTHER PUBLICATIONS

English Abstract and Machine Translation for Japanese Publication No. 5616409 B2, published Oct. 29, 2014, 30 pgs.
(Continued)

*Primary Examiner* — Rina Duda
(74) *Attorney, Agent, or Firm* — Fredrikson & Byron, P.A.

(57) ABSTRACT

A control apparatus of a synchronous motor according to the present invention includes: a current command generation unit for generating a d-phase current command and a q-phase current command; a current detection unit for detecting a d-phase current and a q-phase current; a short-circuiting device for short-circuiting the synchronous motor to apply dynamic braking to the synchronous motor; and a short-circuit control unit for controlling the short-circuiting device; wherein the current command generation unit controls the q-phase current command so as to decrease the q-phase current after receipt of a dynamic braking signal; and the short-circuit control unit controls the short-circuiting device to short-circuit the synchronous motor after the receipt of the dynamic braking signal and after a lapse of a predetermined time from the control of the q-phase current command by the current command generation unit.

6 Claims, 13 Drawing Sheets

(51) Int. Cl.
*H02P 21/22* (2016.01)
*H02P 27/08* (2006.01)
*H02P 21/36* (2016.01)

(58) Field of Classification Search
USPC .................. 318/700, 400.02, 599, 811
See application file for complete search history.

(56) References Cited

U.S. PATENT DOCUMENTS

| | | | | |
|---|---|---|---|---|
| 2007/0090783 | A1* | 4/2007 | Rainer | H02P 3/22 |
| | | | | 318/703 |
| 2013/0221888 | A1* | 8/2013 | Horikoshi | H02P 3/22 |
| | | | | 318/400.29 |
| 2014/0062362 | A1* | 3/2014 | Kawai | H02P 29/662 |
| | | | | 318/400.22 |

FOREIGN PATENT DOCUMENTS

| | | | |
|---|---|---|---|
| DE | 102013109624 | A1 | 4/2014 |
| JP | 200284780 | A | 3/2002 |
| JP | 2006280141 | A | 10/2006 |
| JP | 5113395 | B2 | 1/2013 |
| JP | 201399210 | A | 5/2013 |
| JP | 2013188000 | A | 9/2013 |
| JP | 201454064 | A | 3/2014 |
| JP | 5616409 | B2 | 10/2014 |
| JP | 201523649 | A | 2/2015 |
| WO | 2014091602 | A1 | 6/2014 |

OTHER PUBLICATIONS

English Abstract and Machine Translation for Japanese Publication No. 2013-099210 A, published May 20, 2013, 19 pgs.
English Abstract and Machine Translation for Japanese Publication No. 5113395 B2, published Jan. 9, 2013, 9 pgs.
English Abstract and Machine Translation for Japanese Publication No. 2015-023649 A, published Feb. 2, 2015, 20 pgs.
English Abstract and Machine Translation for Japanese Publication No. 2014-054064 A, published Mar. 20, 2014, 16 pgs.
English English Abstract for Japanese Publication No. 2013-188000 A, published Sep. 19, 2013, 1 pg.
English Abstract for Japanese Publication No. 2006-280141 A, published Oct. 12, 2006, 1 pg.
English Abstract for Japanese Publication No. 2002-084780 A, published Mar. 22, 2002, 1 pg.
English Abstract and Machine Translation for German Publication No. 102013109624 A1, dated Apr. 3, 2014, 16 pgs.
English Abstract and Machine Translation for German Publication No. 102011001278 A1, dated Mar. 27, 2014, 22 pgs.
English Abstract and Machine Translation for German Publication No. 19944244 A1, dated Mar. 30, 2000, 15 pgs.

* cited by examiner

DURING DYNAMIC BRAKING

CURRENT PHASE CHANGED $I_{d2} > I_{d1}$
$I_{q1} > I_{q2}$

CONTROL APPARATUS OF SYNCHRONOUS MOTOR

BACKGROUND OF THE INVENTION

1. Field of the Invention

The present invention relates to a control apparatus of a synchronous motor, and in particular to a control apparatus of a synchronous motor for preventing demagnetization in the synchronous motor during a dynamic braking operation.

2. Description of the Related Art

Dynamic braking is used to perform emergency stop of a synchronous motor. A brief description will now be made of dynamic braking. In FIG. 1A, there is shown a state of connection between a synchronous motor (hereinafter, referred to simply as "motor") and a driving amplifier during driving of the motor. A motor 100 is connected to a driving amplifier 200 via power lines 300, so that a current flows through a three-phase coil (not illustrated) of the motor 100. FIG. 1B is a voltage vector diagram illustrated on a d-q coordinate during operation of the motor, wherein $I_d$ is a d-phase current, $I_q$ is a q-phase current, $V_d$ is a d-phase voltage, $V_q$ is a q-phase voltage, $L_d$ is a d-axis inductance, $L_q$ is a q-axis inductance, ω is a frequency, $K_v$ is a counter electromotive voltage constant, and R is a winding resistance.

When dynamic braking operation is performed, as illustrated in FIG. 2A, the motor 100 is disconnected from the driving amplifier 200 so that the power lines 300 connected to the three-phase coil of the motor 100 are placed in a shorted state, and a current that is caused to flow through the three-phase coil due to an induced voltage of the motor 100 is used as a control current to brake the motor 100. FIG. 2B is a voltage vector diagram illustrated on a d-q coordinate during dynamic braking operation of the motor. During the dynamic braking operation, the voltage across terminals of the motor 100 becomes zero (0) [V]. Consequently, the q-phase current $I_q$ (torque generation current), which is in opposite direction so as to cancel the counter electromotive voltage $K_v\omega$, flows in the motor so that braking occurs.

Upon initiation of the dynamic braking operation, the voltage across terminals is abruptly varied from a large value to 0 [V]. Thus, immediately after the dynamic braking (hereinafter, also referred to as "DB") is initiated, the current amplitude become oscillatory. Changes over time in the d-phase current $I_d$ and q-phase current $I_q$ after the initiation of DB are illustrated in FIGS. 3A and 3B. FIG. 3A illustrates a case in which the initial q-phase current $I_q$ immediately after the initiation of DB at the time 0 [sec] is 0 [A]. FIG. 3B illustrates a case in which the initial q-phase current $I_q$ is large. Let it be assumed, for the sake of convenience, that the q-phase current $I_q$ (torque generation current) accelerates the motor when being positive on the graph and decelerates the motor when being negative. Further, let it be assumed that the d-phase current $I_d$ (field weakening current) acts to weaken the field when being positive on the graph.

As illustrated in FIG. 3A, even when the initial q-phase current $I_q$ is 0 [A], the d-phase current $I_d$ oscillates, but the current amplitude is relatively small. In contrast, when the initial q-phase current $I_q$ is large as illustrated in FIG. 3B, the amplitude of the d-phase current $I_d$ becomes larger than when the initial q-phase current $I_q$ is 0 [A]. Especially, at a time $t_m$ immediately after initiation of DB, the d-phase current $I_d$ is increased momentarily, so that there is a possibility that demagnetization is caused in the permanent magnet used for the rotor of the motor.

There are methods for suppressing demagnetization from being caused due to the dynamic braking operation (for example as described in, Japanese Patent No. 5616409, Japanese Laid-open Patent Publication No. 2013-099210, and Japanese Patent No. 5113395 referred to hereinafter as "Patent Documents 1-3", respectively. In Patent Document 1, there is disclosed a method for controlling a current of a synchronous motor such that the current value of the synchronous motor becomes less than a maximum current value in order to prevent irreversible demagnetization of a permanent magnet which could be caused by a transient current occurring in the case of three-phase short-circuit. However, there is a problem in that the torque is limited unnecessarily since the q-phase current $I_q$ is limited beforehand to suppress the current.

In Patent Document 2, there is disclosed a motor control apparatus including three switching elements configured, when turned on, to cause three phase coils of a three-phase motor to be short-circuited and when turned off, to eliminate the short-circuit of the three phase coils, wherein in the case where a current flowing through any one phase coil of the three phase coils exceeds a predetermined threshold value when the three switching elements are in a turned-on state, the three switching elements are turned off for a first predetermined period of time, and turned on after a lapse of the first predetermined period of time. However, since it occurs after the current of the coils exceeds the predetermined threshold value that the short-circuiting of the coils is eliminated, it is difficult to completely suppress demagnetization due to dynamic braking operation.

In Patent Document 3, there is disclosed a dynamic braking device for a motor including the dynamic braking device for causing the motor to be emergency-stopped, wherein during a predetermined period of time after a dynamic braking operation is initiated, a control is performed such that a dynamic braking current is weakened via application braking with a PWM control in which at least part of switching elements to control the brake current are repetitively turned on and off, and after lapse of the predetermined period of time, a control is performed such that a dynamic braking current, which should originally flow, is permitted to flow with all the switching elements being fixed in the on or off state at all times without executing the PWM control. However, since, in this case as well, it is after the dynamic braking operation is initiated that the dynamic braking current is controlled to be weakened, it is difficult to completely suppress demagnetization due to dynamic braking.

SUMMARY OF THE INVENTION

Accordingly, it is an object of the present invention to provide a control apparatus of a synchronous motor which enables a dynamic braking operation while avoiding demagnetization of the synchronous motor without limiting torque excessively.

The control apparatus of the synchronous motor according to an embodiment of the present invention includes: a current command generation unit for generating a d-phase current command and a q-phase current command; a current detection unit for detecting the d-phase current and the q-phase current; a short-circuiting device for short-circuiting a synchronous motor to apply dynamic braking to the synchronous motor; and a short-circuit control unit for controlling the short-circuiting device; wherein the current command generation unit controls the q-phase current command so as to decrease the q-phase current after receiving a dynamic braking signal, and the short-circuit control unit controls the short-circuiting device to short-circuit the synchronous motor after receiving the dynamic braking signal and after a lapse of a predetermined time from the control of the q-phase current command by the current command generation unit.

BRIEF DESCRIPTION OF THE DRAWINGS

Objects, features, and advantages of the present invention will become more apparent from the following description of embodiments taken in conjunction with the accompanying drawings, in which.

DETAILED DESCRIPTION

Figure 1B:
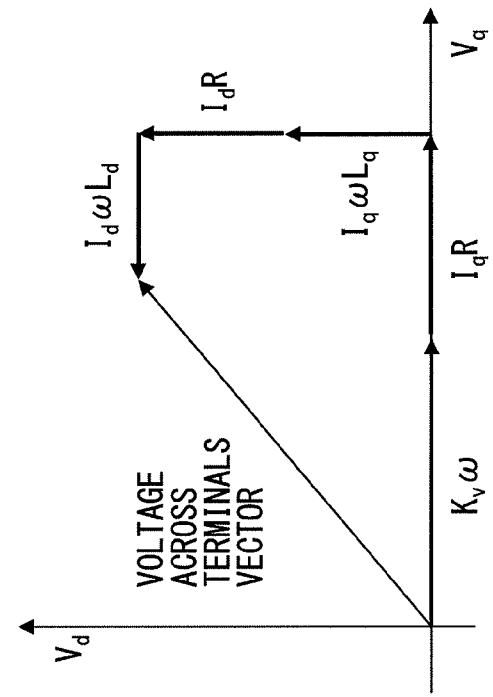
FIG. 1B is a view illustrating, in the conventional synchronous motor, voltage vectors on the d-q coordinate during driving of the synchronous motor (motor)
Figure 1A:
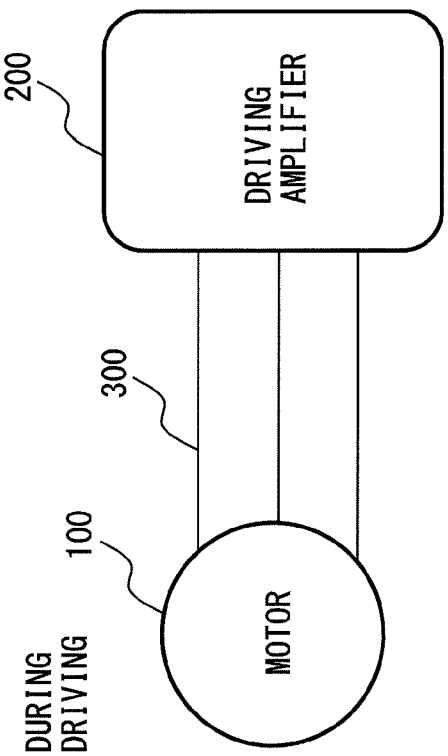
FIG. 1A is a view illustrating, in a conventional synchronous motor, a state in which during driving of the synchronous motor (motor), the motor and a driving amplifier are connected.
Figure 2A:
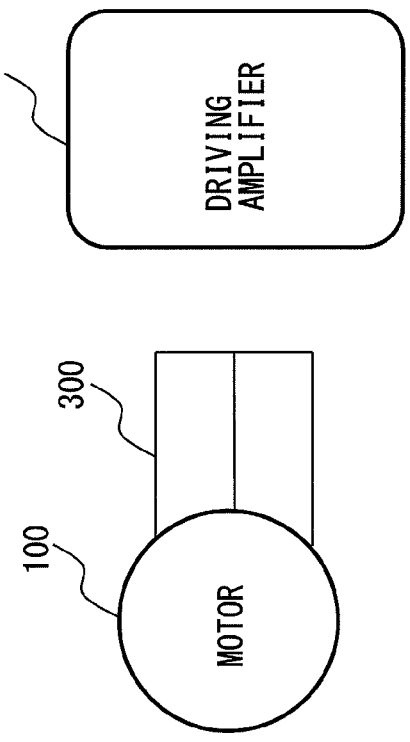
FIG. 2A is a view illustrating, in the conventional synchronous motor, a state in which during dynamic braking operation of the synchronous motor (motor), the motor and the driving amplifier are connected.
Figure 2B:
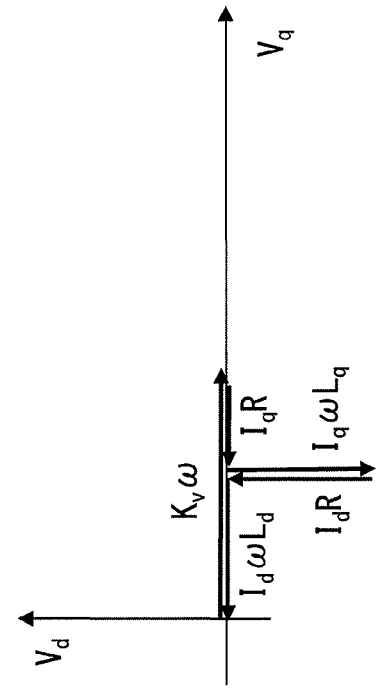
FIG. 2B is a view illustrating, in the conventional synchronous motor, voltage vectors on the d-q coordinate during dynamic braking operation of the synchronous motor (motor)

Referring to the drawings, description will be made of the control apparatus of the synchronous motor according to embodiments of the present invention hereinafter. However, it is to be noted that the technical scope of the present invention is not limited to the embodiments but encompasses the inventions set forth in the claims and equivalents thereof.

First Embodiment

Figure 4:
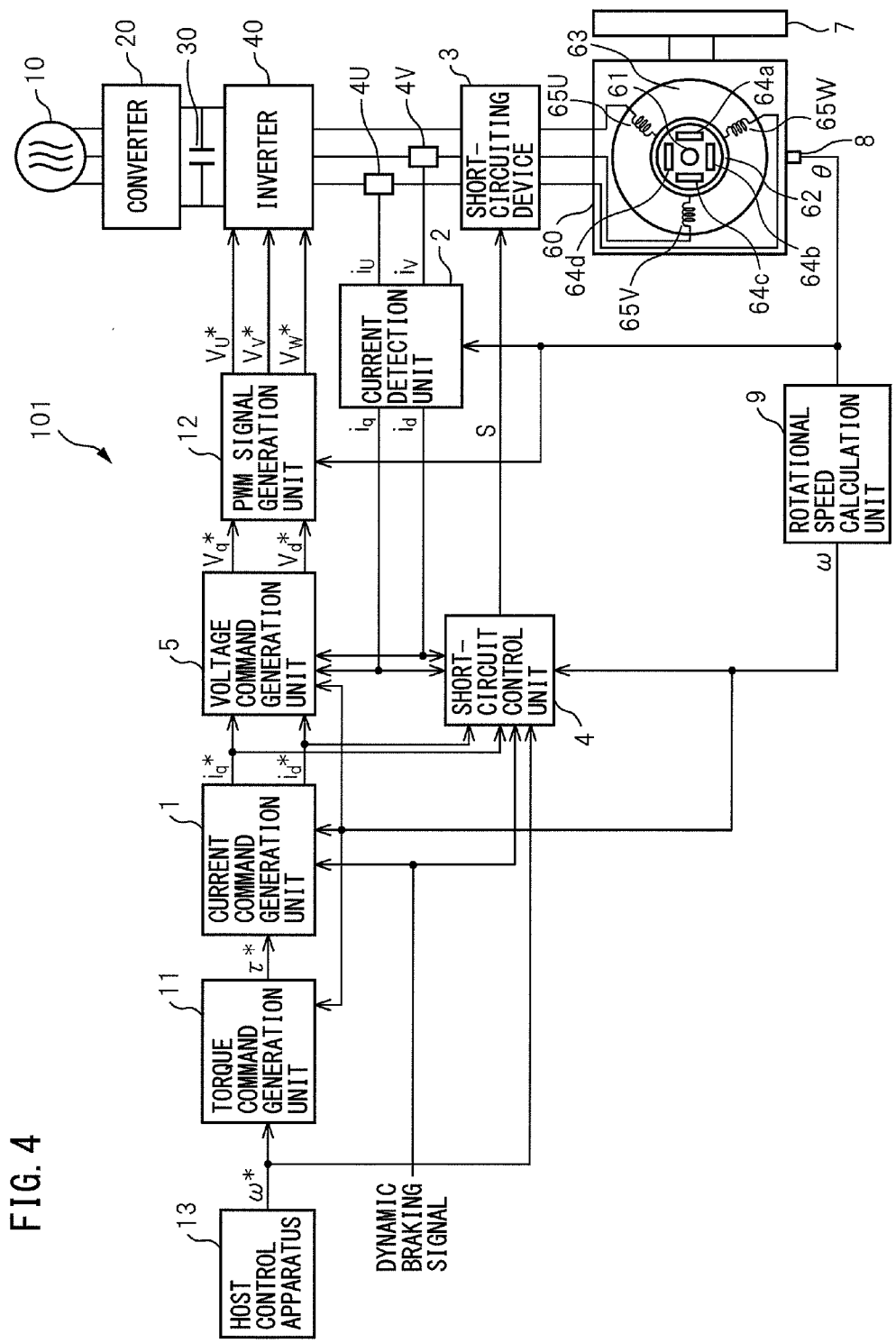
FIG. 4 is a block diagram of a control apparatus of a synchronous motor according to a first embodiment of the present invention.

The control apparatus of the synchronous motor according to a first embodiment of the present invention will be described with reference to the drawings. FIG. 4 is a block diagram of the control apparatus of the synchronous motor according to the first embodiment of the present invention. As illustrated in FIG. 4, the control apparatus 101 of the synchronous motor according to the first embodiment of the present invention comprises: a current command generation unit 1 for generating a d-phase current command and a q-phase current command; a current detection unit 2 for detecting the d-phase current and the q-phase current; a short-circuiting device 3 for short-circuiting a synchronous motor 60 to apply dynamic braking to the synchronous motor 60; and a short-circuit control unit 4 for controlling the short-circuiting device 3; wherein the current command generation unit 1 controls the q-phase current command so as to decrease the q-phase current after receiving a dynamic braking signal, and the short-circuit control unit 4 controls the short-circuiting device 3 to short-circuit the synchronous motor 60 after receiving the dynamic braking signal and after a lapse of a predetermined time from the control of the q-phase current command by the current command generation unit 1.

The control apparatus 101 of the synchronous motor according to the first embodiment of the present invention illustrated in FIG. 4 will be described in detail. A three-phase AC voltage is inputted from a three-phase AC power supply 10 to a converter 20. The converter 20 converts the three-phase AC voltage into a DC voltage and outputs the DC voltage. The outputted DC voltage is smoothed by a smoothing capacitor 30, and then inputted to an inverter 40. The inverter 40 converts the DC voltage via PWM control based on PWM signals $V_U^*$, $V_V^*$, and $V_W^*$ from a PWM signal generation unit 12 to an AC voltage of a desired frequency to drive the synchronous motor 60.

Between the inverter 40 and the synchronous motor 60 is provided a short-circuiting device 3. The short-circuiting device 3 short-circuits terminals of the synchronous motor 60 in accordance with a signal S from the short-circuit control unit 4 and thus performs dynamic braking operation.

A U-phase current $I_U$ and a V-phase current $I_V$ of the three-phase currents supplied to the synchronous motor 60 are detected by a U-phase current detector 4U and a V-phase current detector 4V, respectively, and the result of detection is outputted to a current detection unit 2. The current detection unit 2 calculates the d-phase current $I_d$ and the q-phase current $I_q$ from the U-phase current $I_U$ and the V-phase current $I_V$ and outputs them to the short-circuit control unit 4 and a voltage command generation unit 5.

The synchronous motor 60 includes a stator 63 provided with windings 65U, 65V, and 65W. Further, the synchronous motor 60 includes a rotor 62 that rotates about a center axis 61, wherein the stator 63 is provided inside with magnetic poles 64a-64d. The synchronous motor 60 drives a driven body 7.

Adjacent to the synchronous motor 60 is provided a rotational angle detector 8 that detects a rotational angle θ of the synchronous motor 60. The rotational angle detector 8 outputs the detection value of the rotational angle θ to the current detection unit 2, the PWM signal generation unit 12, and a rotational speed calculation unit 9. The rotational speed calculation unit 9 calculates a rotational speed ω by differentiating the rotational angle θ with time. The calculated rotational speed ω is outputted to the short-circuit control unit 4, the torque command generation unit 11, the current command generation unit 1, and the voltage command generation unit 5.

A host control apparatus 13 outputs a speed command ω* to the torque command generation unit 11 and the short-circuit control unit 4. The torque command generation unit 11 acquires the speed command ω* from the host control apparatus 13, and generates and outputs a torque command τ* to the current command generation unit 1.

The current command generation unit 1 generates a d-phase current command $I_d^*$ and a q-phase current command $I_q^*$ based on the torque command τ* outputted from the torque command generation unit 11 and outputs them to the voltage command generation unit 5 and the short-circuit control unit 4.

The voltage command generation unit 5 generates a d-phase voltage command $V_d^*$ and a q-phase voltage command $V_q^*$ from the d-phase current command $I_d^*$ and the q-phase current command $I_q^*$ and outputs them to the PWM signal generation unit 12.

The PWM signal generation unit 12 generates PWM signals $V_U^*$, $V_V^*$, and $V_W^*$ of the respective phases from the d-phase voltage command $V_d^*$ and the q-phase voltage command $V_q^*$ and outputs them to the inverter 40.

The dynamic braking signal to stop the synchronous motor 60 is inputted from outside the control apparatus 101 of the synchronous motor to the current command generation unit 1 and the short-circuit control unit 4. The present invention is suitably applicable in a case of emergency stop in which normal deceleration stop is not possible, but not limited thereto. For example, the present invention is applicable in deceleration of normal operation as well.

Figure 5:
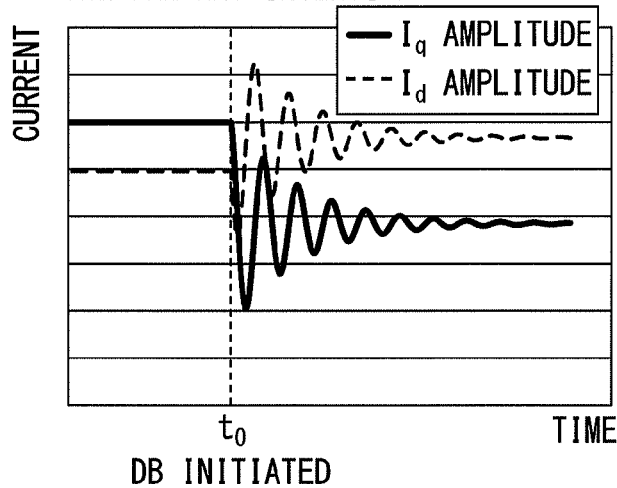
FIG. 5 is a view illustrating variations over time in the d-phase and q-phase currents after dynamic braking operation when the present invention is not applied.

An advantage when the control apparatus of the synchronous motor according to the first embodiment of the present invention is used will be described. FIG. 5 is a view illustrating variations over time in the d-phase and q-phase currents after dynamic braking operation when the present invention is not applied. Let it be assumed that the dynamic braking operation (DB) is initiated at a time $t_0$. Before the DB is initiated, the d-phase current $I_d$ and the q-phase current $I_q$ are constant, while after the DB is initiated, these currents become oscillatory. The larger the q-phase current $I_q$ when the DB is initiated, the larger becomes the amplitude; when the amplitude of the d-phase current $I_d$ is large, there is a possibility that demagnetization of the magnet of the synchronous motor is caused as described above.

Figure 6:
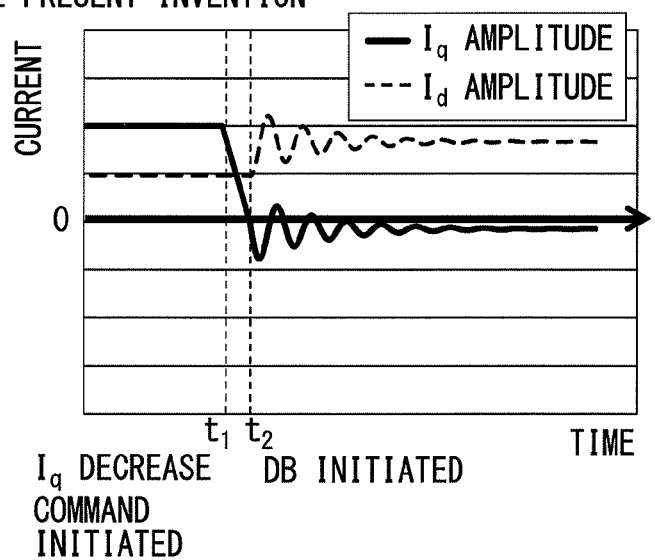
FIG. 6 is a view illustrating variations over time in the d-phase and q-phase currents after the dynamic braking operation when the q-phase current is decreased using the control apparatus of the synchronous motor according to the first embodiment of the present invention.

In the control apparatus of the synchronous motor according to the first embodiment of the present invention, it is configured such that the short-circuit control unit 4 controls the short-circuiting device 3 so as to short-circuit the synchronous motor 60 after receiving a dynamic braking signal and after a lapse of a predetermined time from the control of the q-phase current command by the current demand generation unit 1. In other words, it is configured such that the dynamic braking operation is performed after receiving the dynamic braking signal and the lapse of the predetermined time from the time when the q-phase current command is controlled by the current command generation unit 1, instead of the dynamic brake being operated immediately upon receipt of the dynamic braking signal. In FIG. 6, there is shown a view illustrating variations over time in the d-phase and q-phase currents after the dynamic braking operation when the q-phase current is decreased using the control apparatus of the synchronous motor according to the first embodiment of the present invention. Let it be assumed that the current command generation unit 1 and the short-circuit control unit 4 receive the dynamic braking signal at a time $t_1$. The current command generation unit 1 controls the q-phase current command such that the q-phase current $I_q$ decreases at the time $t_1$. Thereupon, the q-phase current $I_q$ begins decreasing at and after the time $t_1$. The dynamic braking operation is initiated at a time $t_2$ when it is assumed that the q-phase current $I_q$ has decreased sufficiently. As will be appreciated, in the present invention, it is configured such that the dynamic braking operation is delayed than the timing when the dynamic braking signal is received, and during the time, the q-phase current $I_q$ is decreased. Consequently, it is possible to suppress an increase in the d-phase current $I_d$, which is a field weakening current during the dynamic braking operation, thereby avoiding demagnetization of the synchronous motor.

Figure 3B:
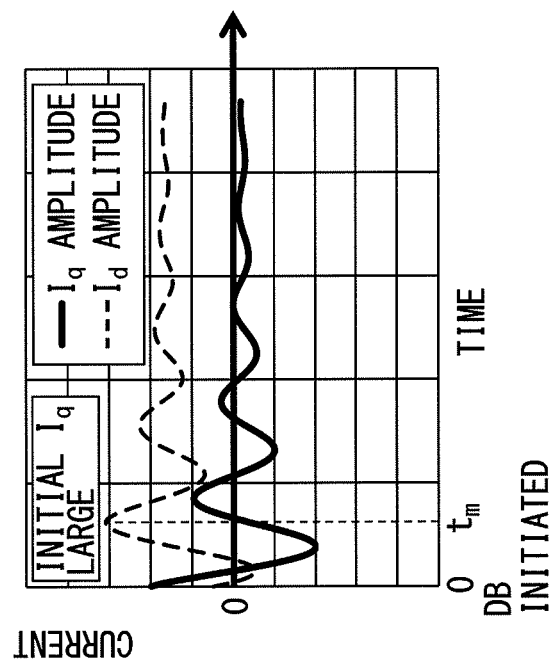
FIG. 3B is a view illustrating, in the conventional synchronous motor, variations over time in the d-phase and q-phase currents after the dynamic braking operation when the q-phase current at the initial stage of the dynamic braking operation is large.
Figure 3A:
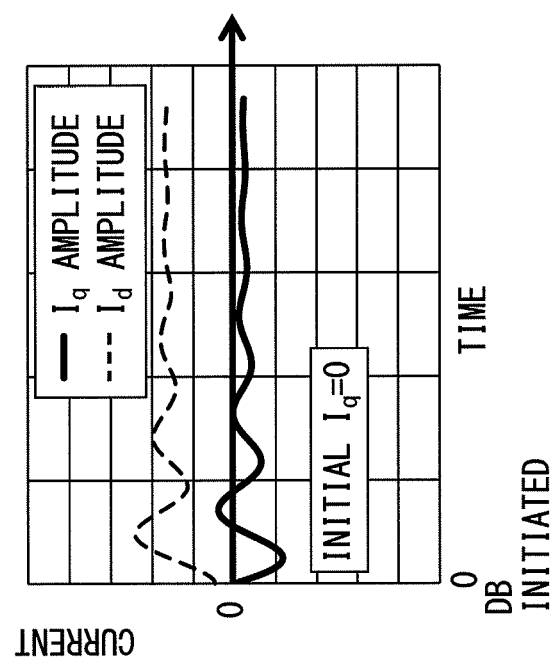
FIG. 3A is a view illustrating, in the conventional synchronous motor, variations over time in the d-phase and q-phase currents after the dynamic braking operation when the q-phase current at the initial stage of the dynamic braking operation is 0 [A]

Description will be made of the fact that it does not always constitute a demerit to delay the dynamic braking operation for the predetermined time as in the present invention, instead of initiating the dynamic braking operation immediately upon receipt of the dynamic braking signal. As illustrated in FIG. 3A, when the q-phase current $I_q$ at the initial stage of the dynamic braking operation is 0 [A], the q-phase current $I_q$ becomes negative and a deceleration torque occurs immediately after the dynamic braking operation. However, as illustrated in FIG. 3B, when the q-phase current $I_q$ at the initial stage of the dynamic braking operation is large, the q-phase current $I_q$ remains positive for a while after the dynamic braking operation, and this means that an acceleration torque occurs. Since the q-phase current $I_q$ becomes oscillatory, the q-phase current $I_q$ becomes positive again. Consequently, when the q-phase current $I_q$ becomes more oscillatory, the time zone generating an acceleration torque becomes longer. Thus, a situation may arise in which the q-phase current $I_q$ oscillates and accelerates momentarily in spite of the dynamic braking operation being performed under a condition that the q-phase current $I_q$ at the initial stage of the dynamic braking operation is large. Consequently, even when the dynamic brake is actuated immediately upon receipt of the dynamic braking signal, it is not always possible to stop the synchronous motor quickly. In view of the above, the delay of the dynamic braking operation does not always constitute a demerit.

Description will next be made of a first modification to the control apparatus of the synchronous motor according to the first embodiment of the present invention. The first modification is characterized in that after receipt of the dynamic braking signal, the current command generation unit 1 controls the q-phase current command so as to decrease the q-phase current and also controls the d-phase current command so as to increase the d-phase current.

Figure 7:
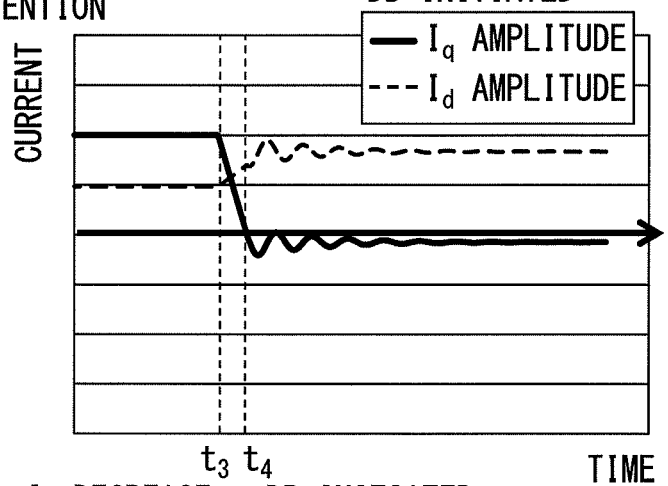
FIG. 7 is a view illustrating variations over time in the d-phase and q-phase currents after the dynamic braking operation when the q-phase current is decreased and the d-phase current is increased using the control apparatus of the synchronous motor according to the first embodiment of the present invention.

In FIG. 7, there is shown a view illustrating variations over time in the d-phase current and q-phase current after the dynamic braking operation when the q-phase current is decreased and the d-phase current is increased using the control apparatus of the synchronous motor according to the first embodiment of the present invention. At a time $t_3$, after receipt of the dynamic braking signal, the current command generation unit 1 controls the q-phase current command so as to decrease the q-phase current $I_q$ and also controls the d-phase current command so as to increase the d-phase current $I_d$. Further, at a time $t_4$ after a predetermined time from the receipt of the dynamic braking signal, the dynamic braking operation is initiated. In this manner, by increasing the d-phase current $I_d$, it is possible to lower the d-phase voltage and q-phase voltage immediately before the dynamic braking operation.

A second modification to the control apparatus of the synchronous motor according to the first embodiment of the present invention will be described. The second modification is characterized in that after receipt of the dynamic braking signal, the current command generation unit 1 controls the d-phase current command and the q-phase current command so as to vary the phase of the current flowing in each of the U-phase, V-phase, and W-phase in such a direction as to decrease the amplitude of the voltage across terminals of the synchronous motor.

Figure 8A:
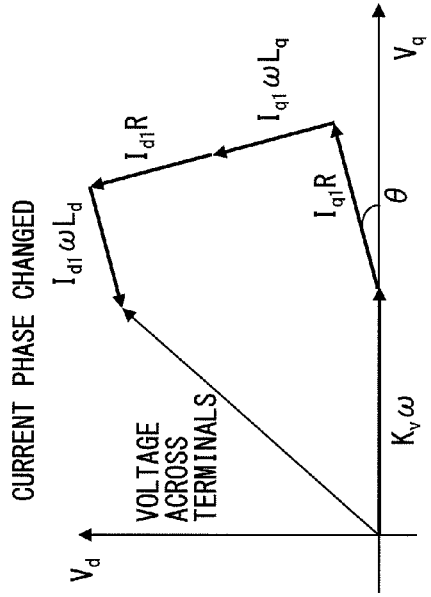
FIG. 8A is a view illustrating voltage vectors on the d-q coordinate before current phase variation.
Figure 8B:
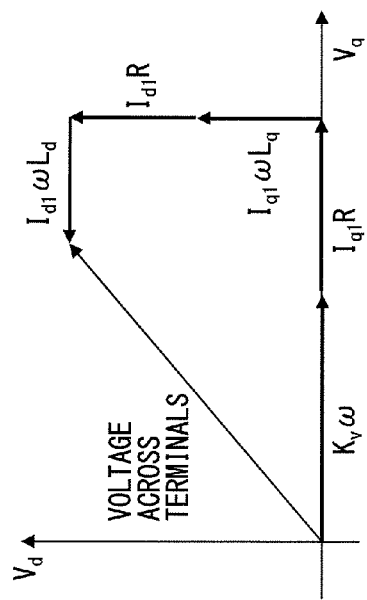
FIG. 8B is a view illustrating voltage vectors on the d-q coordinate after the current phase variation.
Figure 8C:
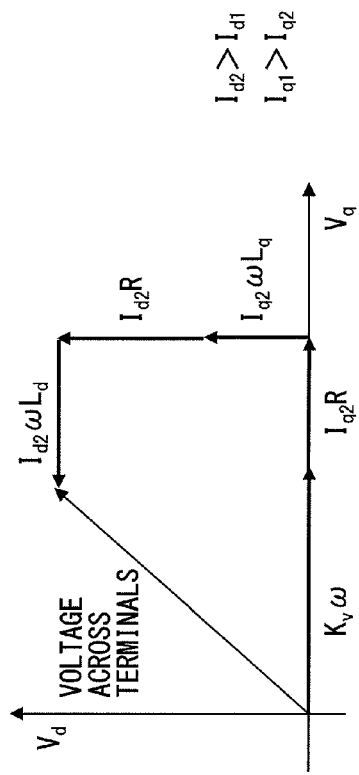
FIG. 8C is a view illustrating voltage vectors on the d-q coordinate after the current phase variation.

In FIGS. 8A and 8B, there are illustrated views illustrating voltage vectors on the d-q coordinate in cases before and after the current phase is varied, respectively. In FIG. 8A, let it be assumed that the d-phase current and the q-phase current before and after the current phase variation are $I_{d1}$ and $I_{q1}$, respectively. A command is generated to shift by θ the phase of the current flowing through each of the U phase, V phase, and W phase without varying the magnitude of the command for each of the d-phase current and the q-phase current. Then, the voltage vectors are changed as in FIG. 8B, and voltage across terminals becomes lower than in FIG. 8A. FIG. 8B becomes equivalent to FIG. 8C in which the voltage across terminals vector is the same. After the current phase variation, $I_{d1}$ and $I_{q1}$ are merely the apparent d-phase current and q-phase current observed from the control apparatus. In contrast, $I_{d2}$ is the substantial d-phase current that contributes to weakening the field, and $I_{q2}$ is the substantial q-phase current that contributes to the torque generation, wherein $I_{d2} > I_{d1}$ and $I_{q1} > I_{q2}$. Thus, it is seen that an effect can be obtained which is similar to that of the above first modification in that substantially the q-phase current is decreased and the d-phase current is increased even when the dynamic braking operation is initiated after a lapse of a predetermined time from shifting the current phase. For the purpose of illustration of the effect of varying the current phase, description has been made of the case in which the magnitudes of the commands for the d-phase current and q-phase current are not varied. However, it is possible that the current phase may be varied while varying the magnitudes of the commands for the d-phase current and q-phase current.

As described above, with the control apparatus of the synchronous motor according to the first embodiment of the present invention, the q-phase current $I_q$ is decreased after receipt of the dynamic braking signal, and the dynamic braking operation is initiated after the lapse of the predetermined time. In this manner, it is possible to perform the dynamic braking operation of the synchronous motor while avoiding demagnetization of the synchronous motor without limiting the torque excessively.

Second Embodiment

Figure 9:
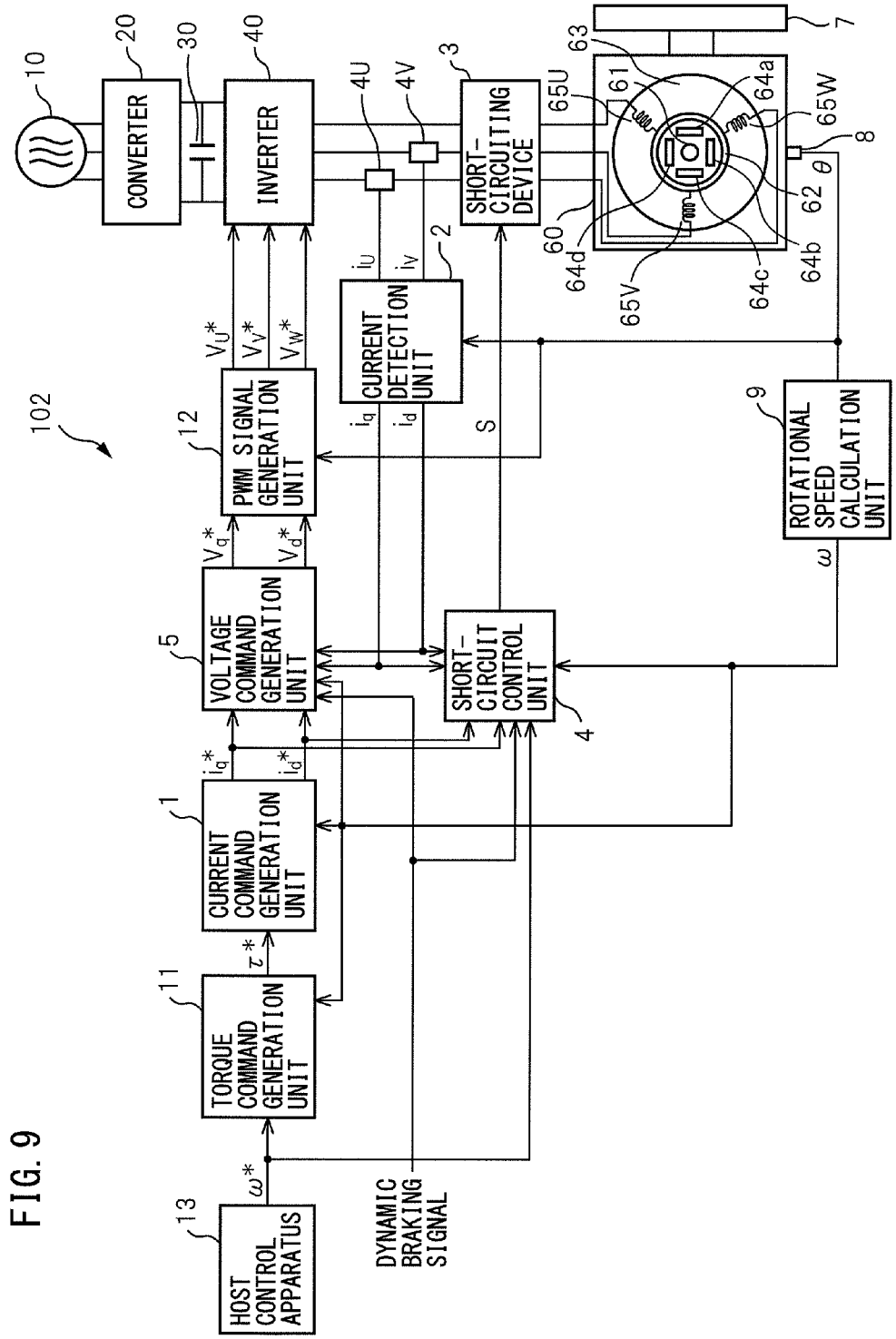
FIG. 9 is a block diagram of a control apparatus of a synchronous motor according to a second embodiment of the present invention.

The control apparatus of the synchronous motor according to a second embodiment of the present invention using the drawings will be described. FIG. 9 is a block diagram of the control apparatus of the synchronous motor according to the second embodiment of the present invention. As illustrated in FIG. 9, the control apparatus 102 of the synchronous motor according to the second embodiment of the present invention includes: a voltage command generation unit 5 for generating a d-phase voltage command and a q-phase voltage command; a current detection unit 2 for detecting a d-phase current and a q-phase current; a short-circuiting device 3 for short-circuiting a synchronous motor 60 to apply dynamic braking to the synchronous motor 60; and a short-circuit control unit 4 for controlling the short-circuiting device 3; wherein the voltage command generation unit 5 controls the d-phase voltage command and the q-phase voltage command after receipt of a dynamic braking signal; and the short-circuit control unit 4 controls the short-circuiting device 3 so as to short-circuit the synchronous motor 60 after receipt of the dynamic braking signal and after a lapse of a predetermined time from the control of the d-phase voltage command and the q-phase voltage command by the voltage command generation unit 5.

The control apparatus 102 of the synchronous motor according to the second embodiment is different from the control apparatus 101 of the synchronous motor according to the first embodiment in the following two points: The first point is such that the voltage command generation unit 5 and the short-circuit control unit 4 receive the dynamic braking signal. The second point is such that the voltage command generation unit 5 controls the d-phase voltage command and the q-phase voltage command after the receipt of the dynamic braking signal, and the short-circuit control unit 4 controls the short-circuiting device 3 so as to short-circuit the synchronous motor 60 after the receipt of the dynamic braking signal and after the lapse of the predetermined time from the control of the d-phase voltage command and the q-phase voltage command by the voltage command generation unit 5. The other configuration of the control apparatus 102 of the synchronous motor according to the second embodiment is similar to that of the control apparatus 101 of the synchronous motor according to the first embodiment, and therefore a detailed description thereof is omitted.

In accordance with the control apparatus of the synchronous motor according to the second embodiment of the present invention, it is arranged such the voltage command generation unit 5 controls the d-phase voltage command and the q-phase voltage command after the receipt of the dynamic braking signal, and the short-circuit control unit 4 controls the short-circuiting device 3 so as to short-circuit the synchronous motor 60 after the receipt of the dynamic braking signal and after the lapse of the predetermined time from the control of the d-phase voltage command and the q-phase voltage command by the voltage command generation unit 5. As such, similarly to the first embodiment, it is possible to decrease the q-phase current $I_q$ during the dynamic braking operation. Consequently, it is possible to perform the dynamic braking operation of the synchronous motor 60 while avoiding demagnetization of the synchronous motor 60 without limiting the torque excessively.

Third Embodiment

Description will next be made of the control apparatus of the synchronous motor according to a third embodiment of the present invention. The configuration of the control apparatus of the synchronous motor according to the third embodiment of the present invention is similar to that of the control apparatus of the synchronous motor according to the first embodiment of the present invention illustrated in FIG. 4. The control apparatus of the synchronous motor according to the third embodiment of the present invention includes: a current command generation unit 1 for generating a d-phase current command and a q-phase current command; a current detection unit 2 for detecting a d-phase current and a q-phase current; a short-circuiting device 3 for short-circuiting the synchronous motor 60 to apply dynamic braking to the synchronous motor 60; and a short-circuit control unit 4 for controlling the short-circuiting device 3; wherein the current command generation unit 1 controls the q-phase current command after receipt of the dynamic braking signal; and the short-circuit control unit 4 controls the short-circuiting device 3 so as to short-circuit the synchronous motor 60 after receipt of the dynamic braking signal and after the q-phase current reaches a predetermined value.

The control apparatus of the synchronous motor according to the third embodiment is different from the control apparatus of the synchronous motor according to the first embodiment in that the short-circuit control unit 4 controls the short-circuiting device 3 so as to short-circuit the synchronous motor 60 after the receipt of the dynamic braking signal and after the q-phase current reaches the predetermined value, instead of the short-circuit control unit 4 controlling the short-circuiting device 3 so as to short-circuit the synchronous motor 60 after the receipt of the dynamic braking signal and after a lapse of a predetermined time from the control of the q-phase current command by the current command generation unit 1. The other configuration of the control apparatus of the synchronous motor according to the third embodiment is similar to that of the control apparatus of the synchronous motor according to the first embodiment, and therefore a detailed description thereof is omitted.

Figure 10:
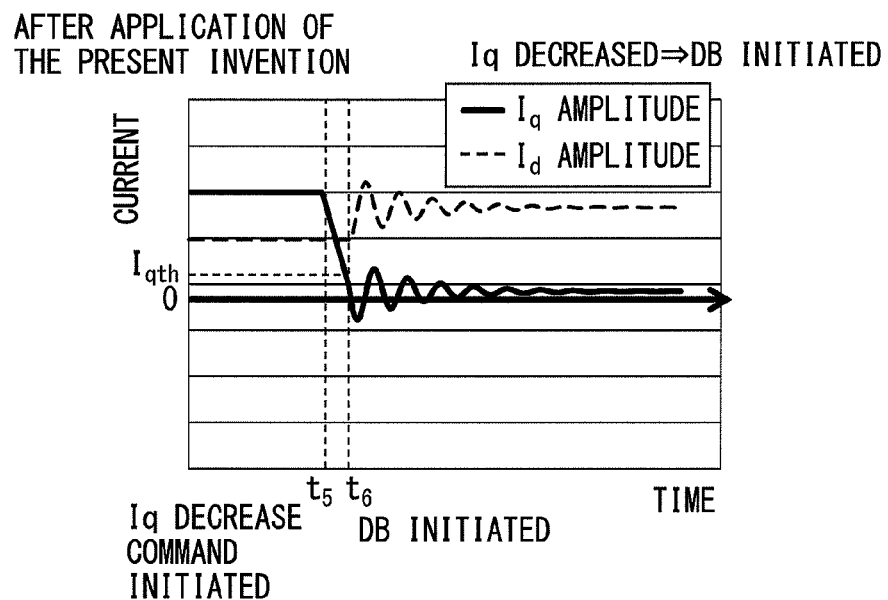
FIG. 10 is a view illustrating variations over time in the d-phase and q-phase currents after the dynamic braking operation when the q-phase current is decreased using the control apparatus of the synchronous motor according to a third embodiment of the present invention.

In FIG. 10, there is shown a view illustrating variations over time in the d-phase current and the q-phase current after the dynamic braking operation when the q-phase current is decreased using the control apparatus of the synchronous motor according to the third embodiment of the present invention. Let it be assumed that the current command generation unit 1 and the short-circuit control unit 4 received the dynamic braking signal at a time $t_5$. The current command generation unit 1 controls the q-phase current command such that the q-phase current $I_q$ is decreased at the time $t_5$. Then, the q-phase current $I_q$ is decreased at and after the time $t_5$, and at a time $t_6$, the q-phase current $I_q$ reaches a predetermined threshold value $I_{qth}$. When it is determined that the q-phase current $I_q$ has reaches the threshold value $I_{qth}$, the short-circuit control unit 4 initiates the dynamic braking operation at the time $t_6$. Thus, in the present invention, the dynamic braking operation is initiated after it is confirmed that the q-phase current $I_q$ has reached the predetermined threshold value $I_{qth}$. Consequently, it is possible to suppress an increase in the d-phase current $I_d$, which is the field weakening current, during the dynamic braking operation, thereby avoiding demagnetization of the synchronous motor 60.

A first modification to the control apparatus of the synchronous motor according to the third embodiment of the present invention will be described. The first modification is characterized in that: after the receipt of the dynamic braking signal, the current command generation unit 1 controls the q-phase current command so as to decrease the q-phase current and also controls the d-phase current command so as to increase the d-phase current; and after the receipt of the dynamic braking signal and after at least one of the q-phase current and d-phase current reaches a respective predetermined value, the short-circuit control unit 4 controls the short-circuiting device 3 so as to short-circuit the synchronous motor 60.

Figure 11:
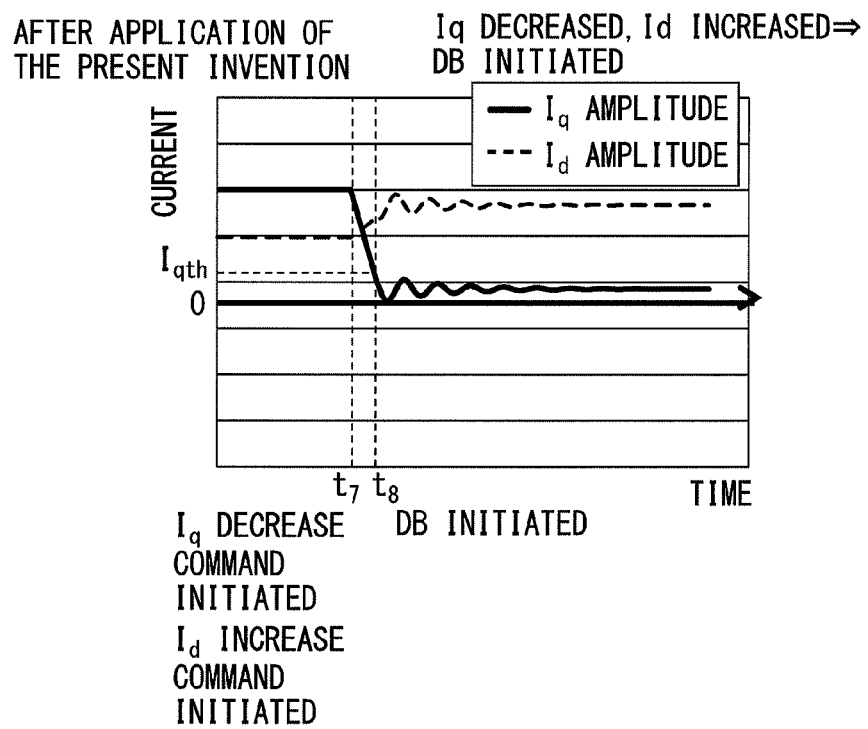
FIG. 11 is a view illustrating variations over time in the d-phase and q-phase currents after the dynamic braking operation when the q-phase current is decreased and the d-phase current is increased using the control apparatus of the synchronous motor according to the third embodiment of the present invention.

In FIG. 11, there is shown a view illustrating variations over time in the d-phase current and q-phase current after the dynamic braking operation when the q-phase current is decreased and the d-phase current is increased using the control apparatus of the synchronous motor according to the third embodiment of the present invention. At a time $t_7$, the current command generation unit 1 controls the q-phase current command so as to decrease the q-phase current $I_q$ and also controls the d-phase current command so as to increase the d-phase current $I_d$, after the receipt of the dynamic braking signal. At a time $t_8$, when it is determined by the short-circuit control unit 4 that the q-phase current $I_q$ has reached the threshold value $I_{qth}$ that is the predetermined value, the dynamic braking operation is initiated. Thus, by increasing the d-phase current $I_d$, it is possible to lower the d-phase voltage and the q-phase voltage immediately before the dynamic braking operation. In the above example, the case was exemplified in which the dynamic braking operation is initiated after it is confirmed that the q-phase current $I_q$ has reached the threshold value $I_{qth}$ that is the predetermined value, but there is no limitation thereto. In other words, it may be configured such that the dynamic braking operation is initiated either after it is confirmed that the d-phase current $I_d$ has reached the threshold value $I_{dth}$ or after it is confirmed that both the q-phase current $I_q$ and the d-phase current $I_d$ have reached their threshold values $I_{qth}$ and $I_{dth}$, respectively.

A second modification to the control apparatus of the synchronous motor according to the third embodiment of the present invention will be described. The second modification is characterized in that: after reception of the dynamic braking signal, the current command generation unit 1 controls the d-phase current command and the q-phase current command so as to vary the phase of the current flowing through each of the U phase, V phase, and W phase toward a direction in which the amplitude of the voltage across terminals of the synchronous motor is decreased or toward the direction of the field weakening current; and after reception of the dynamic braking signal and after at least one of the q-phase current and d-phase current has reached the respective predetermined value, the short-circuit control unit 4 controls the short-circuiting device 3 so as to short-circuit the synchronous motor 60. In the second modification, it is configured such that the q-phase current $I_q$ is decreased and the d-phase current $I_d$ is increased by shifting the phase of the current, and the dynamic braking operation is initiated after it is confirmed that at least one of the q-phase current $I_q$ and the d-phase current $I_d$ has reached the respective predetermined threshold value $I_{qth}$ or $I_{dth}$; thus, an effect similar to that of the above first modification is obtained.

As described above, in accordance with the control apparatus of the synchronous motor according to the third embodiment of the present invention, it is arranged such that the dynamic braking operation is initiated after the receipt of the dynamic braking signal and after it is confirmed that the q-phase current $I_q$ has reached the preset threshold value $I_{qth}$. As such, it is possible to perform the dynamic braking operation of the synchronous motor while avoiding demagnetization of the synchronous motor without limiting the torque excessively.

Fourth Embodiment

The control apparatus of the synchronous motor according to a fourth embodiment of the present invention will be described. The configuration of the control apparatus of the synchronous motor according to the fourth embodiment of the present invention is similar to that of the control apparatus of the synchronous motor according to the second embodiment of the present invention illustrated in FIG. 9. The control apparatus of the synchronous motor according to the fourth embodiment of the present invention includes: a voltage command generation unit 5 for generating a d-phase voltage command and a q-phase voltage command; a current detection unit 2 for detecting a d-phase current and a q-phase current; a short-circuiting device 3 for short-circuiting a synchronous motor 60 in order to apply dynamic braking to the synchronous motor 60; and a short-circuit control unit 4 for controlling the short-circuiting device 3; wherein the voltage command generation unit 5 controls the d-phase voltage command and the q-phase voltage command after receipt of a dynamic braking signal; and the short-circuit control unit 4 controls the short-circuiting device 3 so as to short-circuit the synchronous motor 60 after the receipt of the dynamic braking signal and after at least one of the q-phase voltage and d-phase voltage has reached a respective predetermined value.

The control apparatus of the synchronous motor according to the fourth embodiment is different from the control apparatus of the synchronous motor according to the second embodiment in that the short-circuit control unit 4 controls the short-circuiting device so as to short-circuit the synchronous motor 60 after the receipt of the dynamic braking signal and after the q-phase voltage has reached the predetermined value, instead of the short-circuit control unit 4 controlling the short-circuiting device 3 so as to short-circuit the synchronous motor 60 after the receipt of the dynamic braking signal and after a lapse of a predetermined time from the control of d-phase voltage command and q-phase voltage command by the voltage command generation unit 5. The other configuration of the control apparatus of the synchronous motor according to the fourth embodiment is similar to that of the control apparatus of the synchronous motor according to the second embodiment, and therefore a detailed description thereof is omitted.

Figure 12:
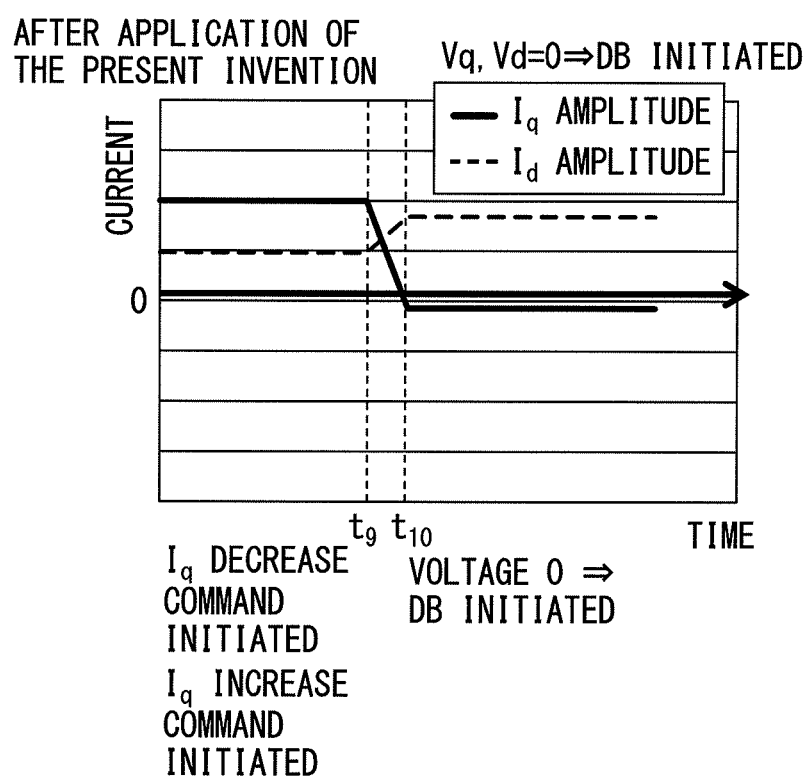
FIG. 12 is a view illustrating variations over time in the d-phase and q-phase currents when the dynamic brake is operated after the d-phase and q-phase voltages are made to be 0 [V] using a control apparatus of a synchronous motor according to a fourth embodiment of the present invention.

In FIG. 12, there is shown a view illustrating variations over time in the d-phase current and q-phase current when the dynamic brake is operated after the d-phase voltage and the q-phase voltage become 0 [V] using the control apparatus of the synchronous motor according to the fourth embodiment of the present invention. In FIG. 12, the example is illustrated in which both the d-phase voltage and the q-phase voltage are made to be 0 [V], but there is no limitation thereto. In other words, it may be configured such that the dynamic brake is operated when at least one of the q-phase voltage and d-phase voltage reaches the respective predetermined other value.

As illustrated in FIG. 12, when the dynamic braking operation is initiated after adjusting the d-phase current $I_d$ and the q-phase current $I_q$ so that the q-phase voltage become 0 [V], the d-phase current $I_d$ and the q-phase current $I_q$ do not oscillate. However, when the d-phase voltage and the q-phase voltage are made to be 0 [V] momentarily after the dynamic braking signal is received, the d-phase current $I_d$ and the q-phase current $I_q$ oscillate similarly to when the dynamic brake is operated immediately. Thus, it is preferable to make the d-phase voltage and the q-phase voltage approach 0 [V] over a certain period of time (e.g., several msec). Thus, in the method in which the d-phase voltage and q-phase voltage are made to gradually approach 0 [V] by adjusting the d-phase voltage command and the q-phase voltage command, what is needed is that the d-phase voltage $V_d$ and the q-phase voltage $V_q$ are made to be 0 [V] indiscriminately when the phases of the d-phase current $I_d$ and the q-phase current $I_q$ are lost. As such, it is possible to use the control apparatus of the synchronous motor according to the third embodiment of the present invention also when for example the angle detector of the motor operates erroneously.

Fifth Embodiment

Figure 13:
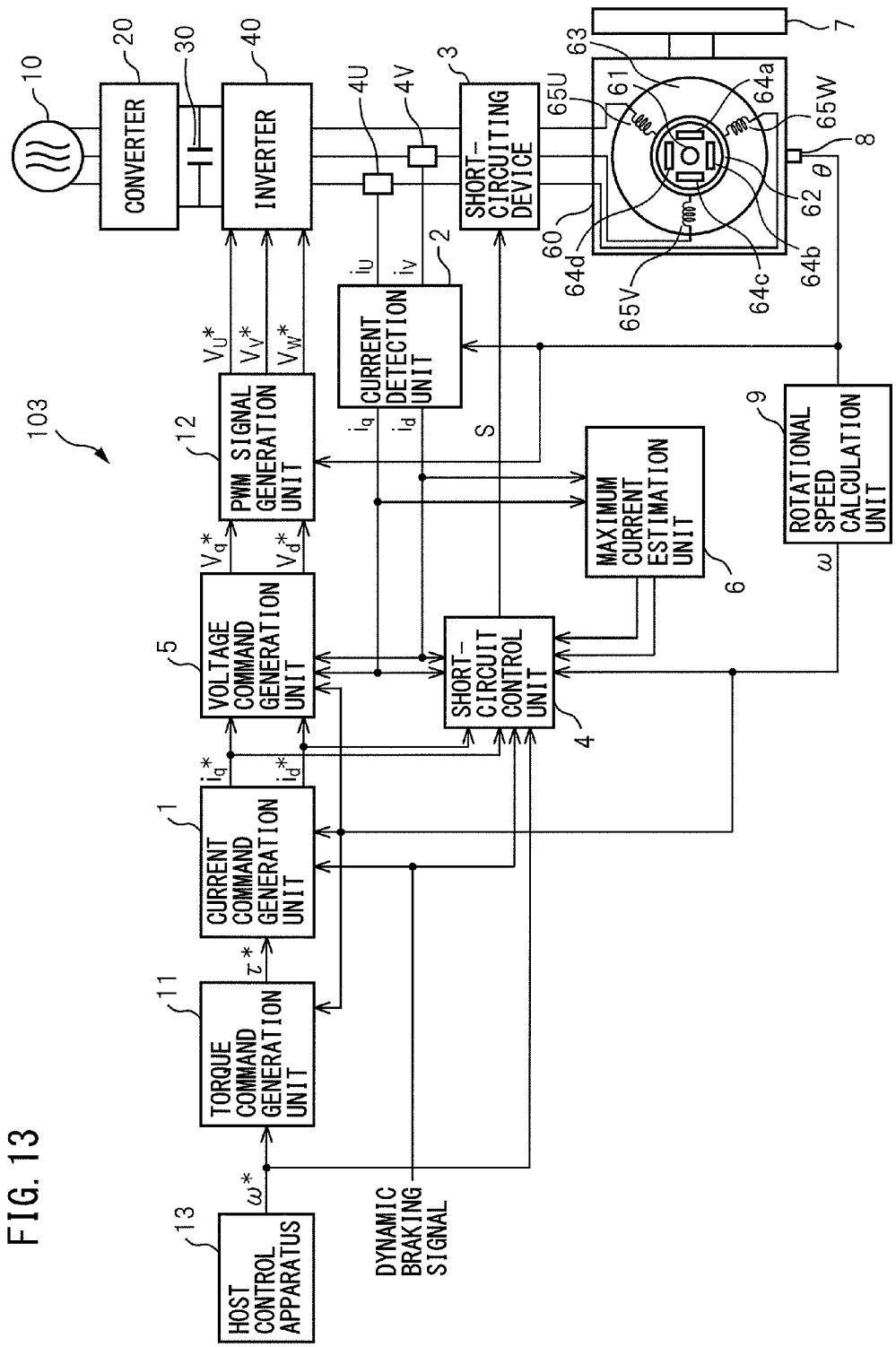
FIG. 13 is a block diagram of a control apparatus of a synchronous motor according to a fifth embodiment of the present invention.

The control apparatus of the synchronous motor according to a fifth embodiment of the present invention will be described. FIG. 13 is a block diagram of the control apparatus of the synchronous motor according to the fifth embodiment of the present invention. As illustrated in FIG. 13, the control apparatus 103 of the synchronous motor according to the fifth embodiment of the present invention includes: a current command generation unit 1 for generating a d-phase current command and a q-phase current command; a current detection unit 2 for detecting a d-phase current and a q-phase current; a short-circuiting device 3 for short-circuiting a synchronous motor 60 in order to apply dynamic braking to the synchronous motor 60; a short-circuit control unit 4 for controlling the short-circuiting device 3; and a maximum current estimation unit 6 for successively estimating the maximum d-phase current based on the detected q-phase current; wherein the current command generation unit 1 controls the q-phase current command so as to decrease the q-phase current after receipt of a dynamic braking signal; and the short-circuit control unit 2 controls the short-circuiting device 3 so as to short-circuit the synchronous motor 60 after the receipt of the dynamic braking signal and after the maximum estimation current after the dynamic braking estimated by maximum current estimation unit 6 becomes smaller than or equal to a tolerance value.

As illustrated in FIG. 5, when the short-circuit control unit 4 initiates the dynamic braking operation immediately upon receipt of the dynamic braking signal, there is a case in which the d-phase current is increased up to a level at which demagnetization of the synchronous motor 60 is caused. Hence, after the receipt of the dynamic braking signal, the current command generation unit 1 controls the q-phase current command so as to decrease the q-phase current. The maximum d-phase current after the dynamic braking operation can be estimated based on the q-phase current during the dynamic braking operation. Thus, in the control apparatus of the synchronous motor according to the fifth embodiment of the present invention, the maximum current estimation unit 6 successively estimates the maximum d-phase current based on the detected value of the q-phase current, and the short-circuit control unit 2 initiates the dynamic braking operation after the receipt of the dynamic braking signal and after the maximum estimated current after the dynamic braking estimated by the maximum current estimation unit 6 becomes smaller than or equal to the tolerance value. In this manner, it is possible to appropriately determine, depending on the detected value of the q-phase current, the time by which the dynamic braking operation is delayed, so that it is possible to quickly stop the synchronous motor while avoiding demagnetization of the synchronous motor.

The tolerance value of the maximum current varies depending on the temperature of the magnet used with the synchronous motor. As such, the higher the magnet temperature, the lower the tolerance value may be made.

A first modification to the control apparatus of the synchronous motor according to the fifth embodiment of the present invention will be described. The first modification is characterized in that after the receipt of the dynamic braking signal, the current command generation unit 1 controls the q-phase current command so as to decrease the q-phase current and also controls the d-phase current command so as to increase the d-phase current.

In accordance with the first modification to the control apparatus of the synchronous motor according to the fifth embodiment of the present invention, similarly to the first modification to the control apparatus of the synchronous motor according to the third embodiment of the present invention described using FIG. 11, it is possible to decrease the d-phase voltage and the q-phase voltage immediately before the dynamic braking operation by increasing the d-phase current $I_d$.

A second modification to the control apparatus of the synchronous motor according to the fifth embodiment of the present invention will be described. The second modification is characterized in that after the receipt of the dynamic braking signal, the current command generation unit 1 controls the d-phase current command and the q-phase current command so as to vary the phase of the current flowing through each of the U phase, V phase, and W phase in such a direction as to decrease the amplitude of the voltage across terminals of the synchronous motor. In the second modification, it is configured such that the q-phase current $I_q$ is decreased and the d-phase current $I_d$ is increased by shifting the phase of the current, and after it is confirmed that the q-phase current $I_q$ has reached the preset threshold value $I_{qth}$, the dynamic braking operation is initiated; thus, an effect similar to that of the first modification is obtained.

As described above, in accordance with the control apparatus of the synchronous motor according to the fifth embodiment of the present invention, the maximum d-phase current after initiation of the dynamic braking operation is successively estimated by providing the maximum current estimation unit, so that it is possible to cause the synchronous motor to be stopped rapidly while avoiding demagnetization of the synchronous motor.

Sixth Embodiment

Figure 14:
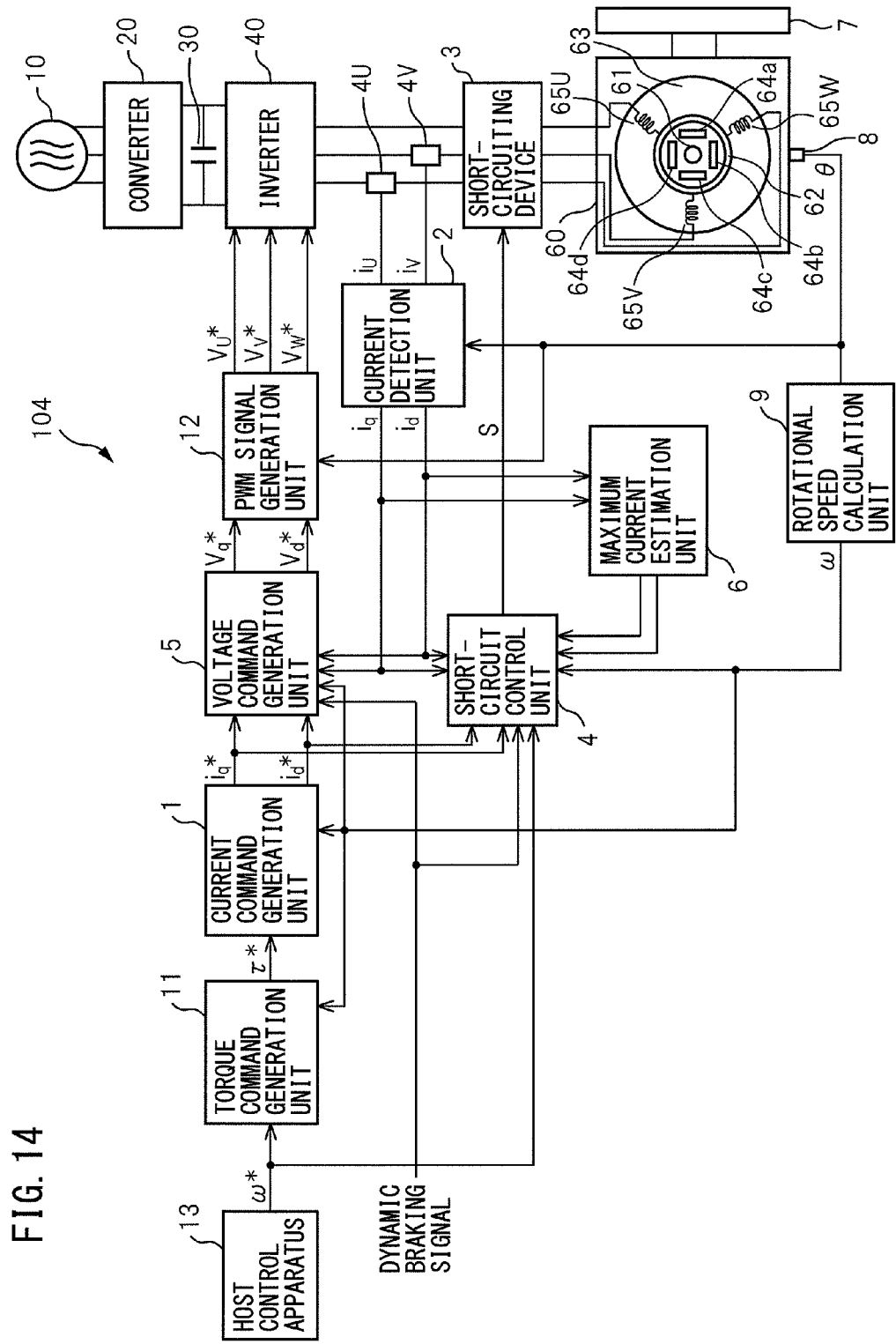
FIG. 14 is a block diagram of a control apparatus of a synchronous motor according to a sixth embodiment of the present invention.

The control apparatus of the synchronous motor according to a sixth embodiment of the present invention using the drawings will be described. FIG. 14 is a block diagram of the control apparatus of the synchronous motor according to the sixth embodiment of the present invention. As illustrated in FIG. 14, the control apparatus 104 of the synchronous motor according to the sixth embodiment of the present invention includes: a voltage command generation unit 5 for generating a d-phase voltage command and a q-phase voltage command; a current detection unit 2 for detecting a d-phase current and a q-phase current; a short-circuiting device 3 for short-circuiting a synchronous motor 60 to apply dynamic braking to the synchronous motor; a short-circuit control unit 4 for controlling the short-circuiting device 3; and a maximum current estimation unit 6 for successively estimating the maximum d-phase current based on the detected q-phase current, wherein the voltage command generation unit 5 controls the d-phase voltage command and the q-phase voltage command after receipt of a dynamic braking signal; and the short-circuit control unit 4 controls the short-circuiting device 3 so as to short-circuit the synchronous motor 60 after the receipt of the dynamic braking signal and after the maximum estimated current after dynamic braking estimated by the maximum current estimation unit 6 becomes smaller than or equal to a tolerance value.

The control apparatus 104 of the synchronous motor according to the sixth embodiment is different from the control apparatus 102 of the synchronous motor according to the second embodiment illustrated in FIG. 9 in that it further includes the maximum current estimation unit 6 that successively estimates the maximum d-phase current based on the detected q-phase current, and that the short-circuit control unit 4 controls the short-circuiting device 3 so as to short-circuit the synchronous motor 60 after the receipt of the dynamic braking signal and after the maximum estimated current after the dynamic braking estimated by the maximum current estimation unit 6 becomes smaller than or equal to the tolerance value. The other configuration of the control apparatus 104 of the synchronous motor according to the sixth embodiment is similar to the configuration in the control apparatus 102 of the synchronous motor according to the second embodiment, and therefore a detailed description thereof is omitted.

In accordance with the control apparatus of the synchronous motor according to the sixth embodiment of the present invention, similarly to the control apparatus of the synchronous motor according to the fifth embodiment, the maximum d-phase current after initiation of the dynamic braking operation is successively estimated by providing the maximum current estimation unit, so that it is possible to cause the synchronous motor to be stopped rapidly while avoiding demagnetization of the synchronous motor.

Figure 15:
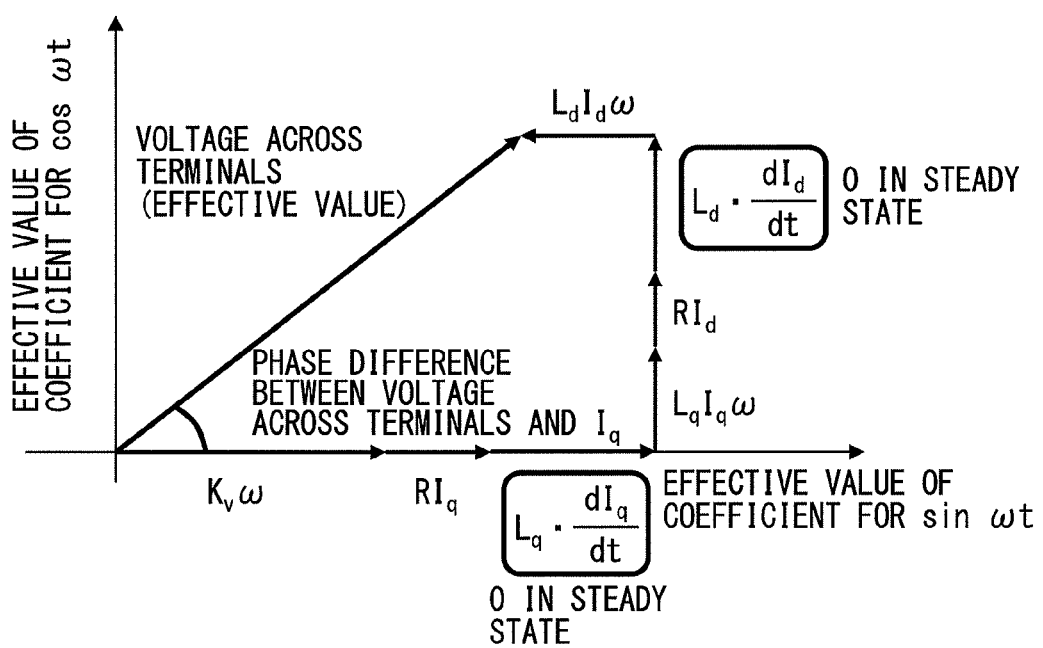
FIG. 15 is a view illustrating voltage vectors on the d-q coordinate in a transient state after the dynamic braking operation.

The d-phase current and the q-phase current in a transient state after the dynamic braking operation will be described. In FIG. 15, there is shown a view illustrating voltage vectors on the d-q coordinate when the transient state after the dynamic braking operation is taken into account. In FIG. 15, the effective value of the coefficient for sin ωt is indicated on the horizontal axis, and the effective value of the coefficient for cos ωt is indicated on the vertical axis. Then, the voltage across terminals of the synchronous motor is represented by equation (1) as follows:

$$\sqrt{2}\left(K_v\omega + RI_q + L_q \cdot \frac{dI_q}{dt} - L_d I_d \omega\right)\sin \omega t + \qquad (1)$$

$$\sqrt{2}\left(RI_d + L_q I_q \omega + L_d \cdot \frac{dI_q}{dt}\right)\cos \omega t$$

After the dynamic braking operation, the voltage across terminals is 0 [V] all the time; therefore, the following equations (2) and (3) hold true:

$$K_v \omega + RI_q + L_q \cdot \frac{dI_q}{dt} - L_d I_d \omega = 0 \qquad (2)$$

$$RI_d + L_q I_q \omega + L_d \cdot \frac{dI_d}{dt} = 0 \qquad (3)$$

By rewriting the above equations (2) and (3), the following equations (4) and (5) can be obtained:

$$\frac{dI_q}{dt} = \frac{1}{L_q}(-K_v \omega - RI_q + L_d I_d \omega) \qquad (4)$$

$$\frac{dI_d}{dt} = \frac{1}{L_d}(-RI_d - L_q I_q \omega) \qquad (5)$$

When $\Delta t$ is small, the following equations (6) and (7) hold true:

$$I_q(t + \Delta t) = I_q(t) + \frac{dI_q}{dt} \cdot \Delta t \qquad (6)$$

$$I_d(t + \Delta t) = I_d(t) + \frac{dI_d}{dt} \cdot \Delta t \qquad (7)$$

Thus, the following equations (8) and (9) can be obtained:

$$I_q(t + \Delta t) = I_q(t) + \frac{1}{L_q}(-K_v \omega - RI_q + L_d I_d \omega)\Delta t \qquad (8)$$

$$I_d(t + \Delta t) = I_d(t) + \frac{1}{L_d}(-RI_d - L_q I_q \omega)\Delta t \qquad (9)$$

Using the above equations (8) and (9), it is possible to calculate the d-phase current and the q-phase current in the transient state after the dynamic braking operation.

As described above, in accordance with the control apparatus of the synchronous motor according to the present invention, it is possible to perform the dynamic braking operation while avoiding demagnetization of the synchronous motor without limiting the torque excessively.

What is claimed is:

1. A control apparatus of a synchronous motor, comprising:
   a current command generation unit for generating a d-phase current command and a q-phase current command;
   a current detection unit for detecting a d-phase current and a q-phase current;
   a short-circuit device for short-circuiting the synchronous motor to apply dynamic braking to the synchronous motor; and
   a short-circuit control unit for controlling the short-circuiting device,
   wherein the current command generation unit controls the q-phase current command so as to decrease the q-phase current after receipt of a dynamic braking signal,
   wherein the short-circuit control unit controls the short-circuiting device so as to short-circuit the synchronous motor after the receipt of the dynamic braking signal and after a lapse of a predetermined time from the control of the q-phase current command by the current command generation unit, and
   wherein after the receipt of the dynamic braking signal, the current command generation unit controls the q-phase current command so as to decrease the q-phase current and controls the d-phase current command so as to increase the d-phase current.

2. A control apparatus of a synchronous motor, comprising:
   a current command generation unit for generating a d-phase current command and a q-phase current command;
   a current detection unit for detecting a d-phase current and a q-phase current:
   a short-circuit device for short-circuiting the synchronous motor to apply dynamic braking to the synchronous motor; and
   a short-circuit control unit for controlling the short-circuiting device,
   wherein the current command generation unit controls the q-phase current command so as to decrease the q-phase current after receipt of a dynamic braking signal,
   wherein the short-circuit control unit controls the short-circuiting device so as to short-circuit the synchronous motor after the receipt of the dynamic braking signal and after a lapse of a predetermined time from the control of the q-phase current command by the current command generation unit, and
   wherein after the receipt of the dynamic braking signal, the current command generation unit controls the d-phase current command and the q-phase current command so as to vary a phase of a current flowing through each of U phase, V phase, and W phase in such a direction as to decrease an amplitude of an voltage across terminals of the synchronous motor.

3. A control apparatus of a synchronous motor, comprising:
   a current command generation unit for generating a d-phase current command and a q-phase current command;
   a current detection unit for detecting a d-phase current and a q-phase current;
   a short-circuiting device for short-circuiting the synchronous motor to apply dynamic braking to the synchronous motor; and
   a short-circuit control unit for controlling the short-circuiting device,
   wherein the current command generation unit controls the q-phase current command so as to decrease the q-phase current after receipt of a dynamic braking signal,
   wherein the short-circuit control unit controls the short-circuiting device so as to short-circuit the synchronous motor after the receipt of the dynamic braking signal and after the q-phase current reaches a predetermined value,
   wherein after the receipt of the dynamic braking signal, the current command generation unit controls the q-phase current command so as to decrease the q-phase current and controls the d-phase current command so as to increase the d-phase current, and
   wherein after the receipt of the dynamic braking signal and after at least one of the q-phase current and the d-phase current reaches a respective predetermined value, the short-circuit control unit controls the short-circuiting device so as to short-circuit the synchronous motor.

4. A control apparatus of a synchronous motor, comprising:

a current command generation unit for generating a d-phase current command and a q-phase current command;

a current detection unit for detecting a d-phase current and a q-phase current;

a short-circuiting device for short-circuiting the synchronous motor to apply dynamic braking to the synchronous motor; and a short-circuit control unit for controlling the short-circuiting device, wherein the current command generation unit controls the q-phase current command so as to decrease the q-phase current after receipt of a dynamic braking signal, wherein the short-circuit control unit controls the short-circuiting device so as to short-circuit the synchronous motor after the receipt of the dynamic braking signal and after the q-phase current reaches a predetermined value, wherein after the receipt of the dynamic braking signal, the current command generation unit controls the d-phase current command and the q-phase current command so as to vary a phase of a current flowing through each of U phase, V phase, and W phase in such a direction as to decrease an amplitude of an voltage across terminals of the synchronous motor, and wherein after the receipt of the dynamic braking signal and after at least one of the q-phase current and the d-phase current reaches a respective predetermined value, the short-circuit control unit controls the short-circuiting device so as to short-circuit the synchronous motor.

5. A control apparatus of a synchronous motor, comprising:

a current command generation unit for generating a d-phase current command and a q-phase current command;

a current detection unit for detecting a d-phase current and a q-phase current;

a short-circuiting device for short-circuiting the synchronous motor to apply dynamic braking to the synchronous motor;

a short-circuit control unit for controlling the short-circuiting device; and a maximum current estimation unit for successively estimating a maximum d-phase current based on the detected q-phase current, wherein the current command generation unit controls the q-phase current command so as to decrease the q-phase current after receipt of a dynamic braking signal, wherein the short-circuit control unit controls the short-circuiting device so as to short-circuit the synchronous motor after the receipt of the dynamic braking signal and after the maximum estimated current after a dynamic braking operation estimated by the maximum current estimation unit becomes smaller than or equal to a tolerance value, and wherein after the receipt of the dynamic braking signal, the current command generation unit controls the q-phase current command so as to decrease the q-phase current and controls the d-phase current command so as to increase the d-phase current.

6. A control apparatus of a synchronous motor, comprising:

a current command generation unit for generating a d-phase current command and a q-phase current command;

a current detection unit for detecting a d-phase current and a q-phase current;

a short-circuiting device for short-circuiting the synchronous motor to apply dynamic braking to the synchronous motor;

a short-circuit control unit for controlling the short-circuiting device; and a maximum current estimation unit for successively estimating a maximum d-phase current based on the detected q-phase current, wherein the current command generation unit controls the q-phase current command so as to decrease the q-phase current after receipt of a dynamic braking signal, wherein the short-circuit control unit controls the short-circuiting device so as to short-circuit the synchronous motor after the receipt of the dynamic braking signal and after the maximum estimated current after a dynamic braking operation estimated by the maximum current estimation unit becomes smaller than or equal to a tolerance value, and wherein after the receipt of the dynamic braking signal, the current command generation unit controls the d-phase current command and the q-phase current command so as to vary a phase of a current flowing through each of U phase, V phase, and W phase in such a direction as to decrease an amplitude of an voltage across terminals of the synchronous motor.

* * * * *